April 22, 1924.

F. F. WEAR

COFFEE GRINDING MILL

Filed March 1, 1923  3 Sheets-Sheet 1

1,491,217

Frank F. Wear.
INVENTOR

BY Francis S. Fox
ATTORNEY

Frank F. Wear.
INVENTOR.

BY Francis St. J. Cox
ATTORNEY.

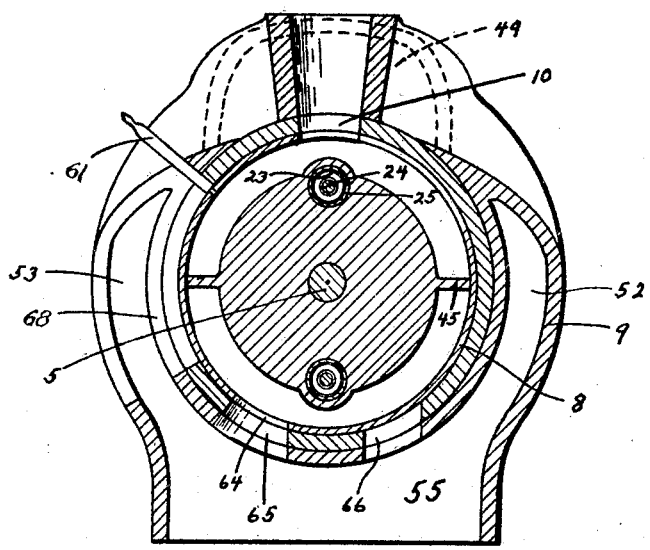
Fig. 7.
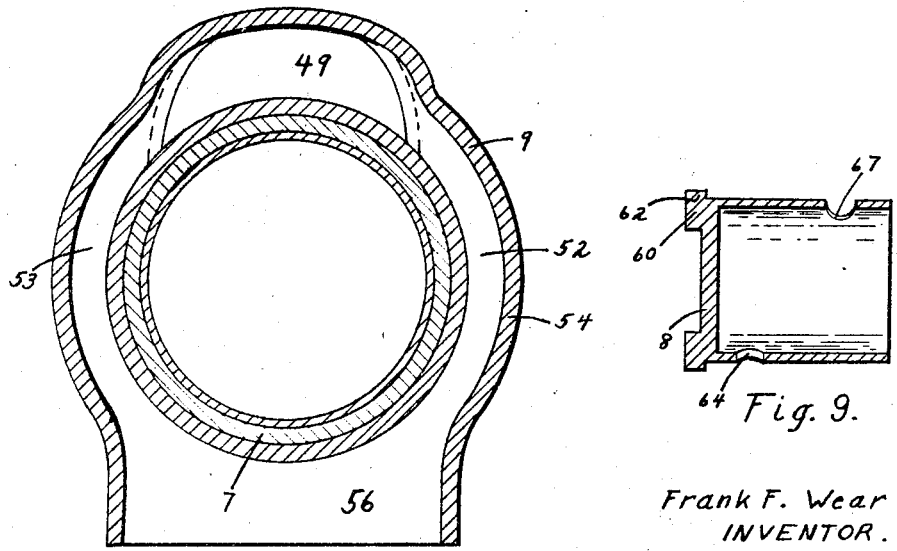
Fig. 8.
Fig. 9.
Frank F. Wear
INVENTOR.

Patented Apr. 22, 1924.

1,491,217

UNITED STATES PATENT OFFICE.

FRANK F. WEAR, OF LOS ANGELES, CALIFORNIA.

COFFEE-GRINDING MILL.

Application filed March 1, 1923. Serial No. 622,164.

*To all whom it may concern:*

Be it known that I, FRANK F. WEAR, a citizen of the United States, and a resident of the city of Los Angeles, county of Los Angeles, State of California, have invented Improvements in a Coffee-Grinding Mill; and I do hereby declare the following to be a full, clear, and exact description of my invention, such as will enable others skilled in the art to which it appertains to make and use the same.

This invention relates to coffee-mills, of the type commonly known as chaff-separators and granulators; and it consists in the novel construction, combination, and arrangement of parts hereinafter described, and later claimed.

The object of my invention is to provide a mill that is attractive in appearance, efficient in operation, durable in construction, and compact in form. Another object, is to provide, at a low manufacturing cost, a mill which has a capacity greater than that of the mills of this type in present day use. This I am able to accomplish by reason of my construction, wherein I combine and take advantage of old parts,—necessarily elements of all such mills of the above type.

The present invention is related to the grinding-mill described in Patent No. 1,220,147, issued March 20, 1917, to Bernard M. Ely and myself, as joint inventors. It comprises certain improvements on the same, by means of which I am able to obtain a capacity greater than that obtainable in the practical operation of the mill described in the above patent. In my present invention I employ much of the same mechanisms for grinding, separating and pulverizing purposes, illustrated in the prior patent, and, consequently, the description herein will closely follow such prior description in such respects. By the addition of new parts, hereinafter noted, and the rearrangement and recombination of elements heretofore shown, I am able to achieve greater capacity at a very slight additional manufacturing cost.

In order that my invention may be clearly understood and readily carried into effect, the same is described with reference to the accompanying drawings, in which similar numerals indicate like parts:

Fig. 7, is a vertical section on the line Y—Y of Fig. 1.

Fig. 8, is a vertical section on the line Z—Z of Fig. 1.

Fig. 9, is a detail sectional view of the valve for selectively controlling the discharge of ground coffee.

Figure 1:
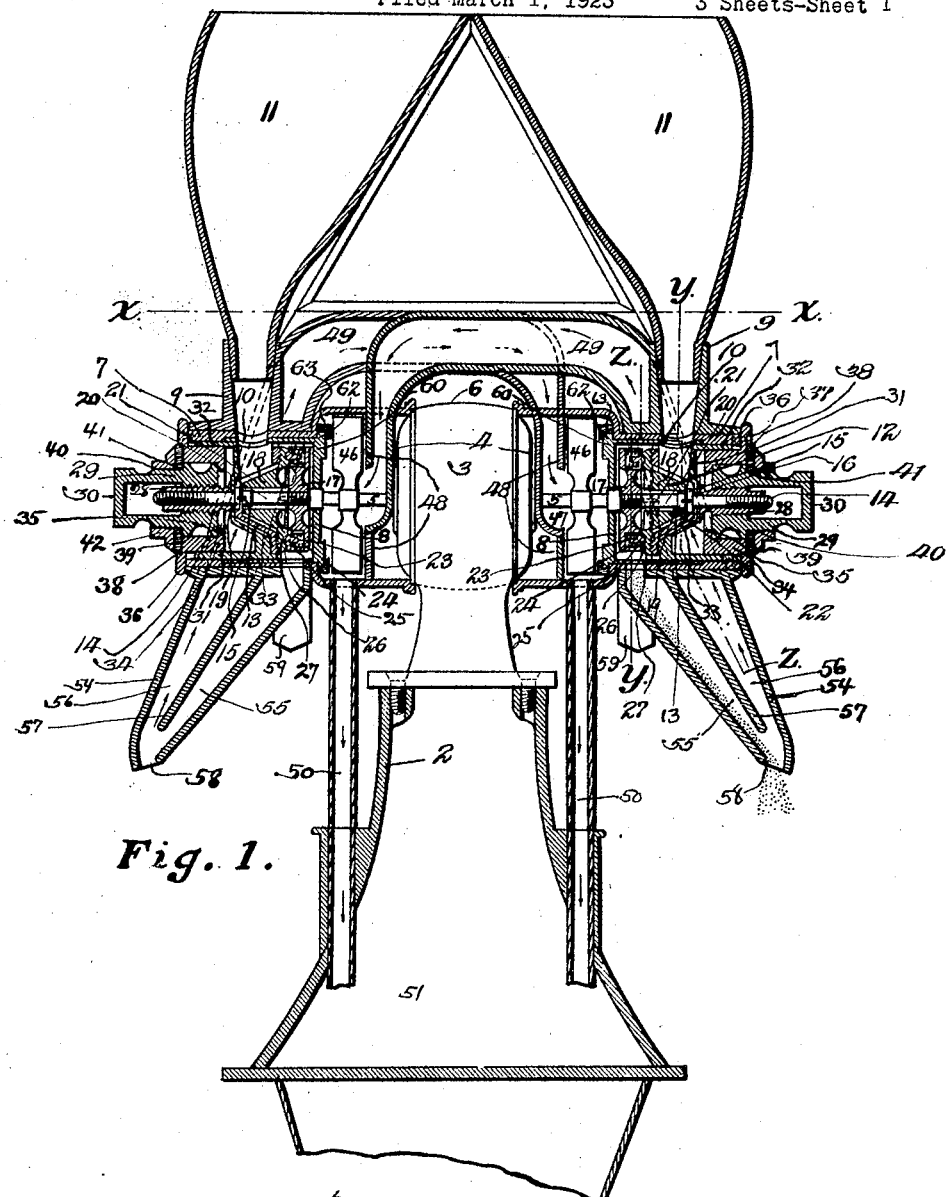
Fig. 1, is a vertical section of my mill with parts so arranged to show the course of the ground coffee when the same is subjected to an air current.
Figure 2:
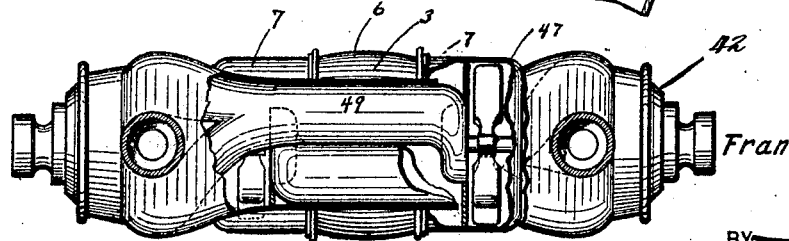
Fig. 2, is a top plan view of my mill, taken on the line X—X of Fig. 1.
Figure 4:
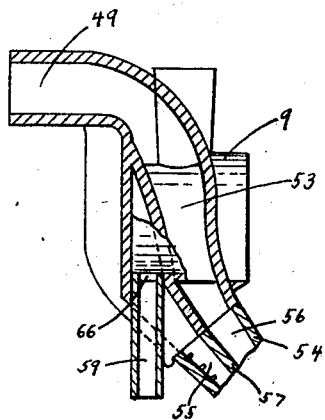
Fig. 4, is a vertical section on the line W—W of Fig. 3.
Figure 5:
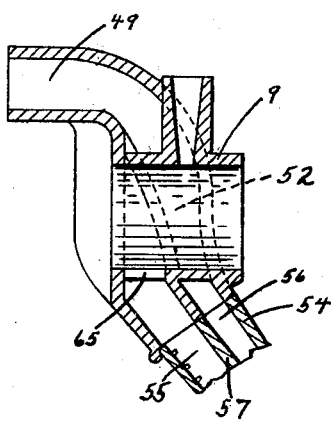
Fig. 5, is a vertical section on the line V—V of Fig. 3.
Figure 3:
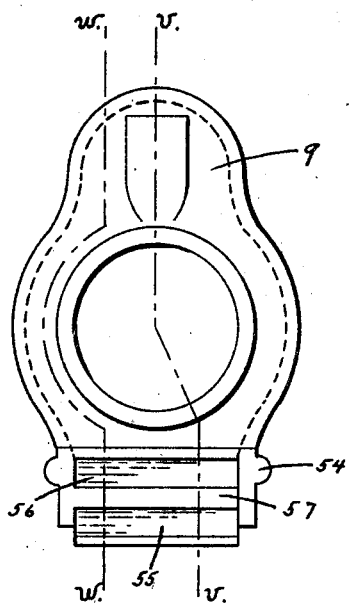
Fig. 3, is an end view of one head of my mill.
Figure 6:
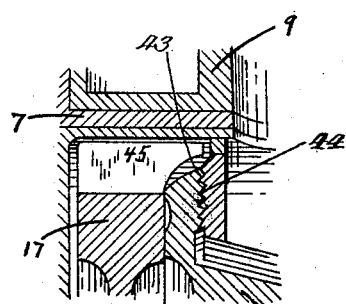
Fig. 6, is a detail section showing one of the wipers, hereafter noted.

The distinguishing features of my construction consist of a base, 2, upon which is supported a motor, 3, through the heads, 4, of which extends a main driving-shaft, 5, to the right and to the left. On each side of the motor is provided a chaff-separating and coffee granulating mechanism. As both such mechanisms are similarly constructed, one specific description will suffice for both, with the exception of one or two differences to be hereafter noted.

In detail, my construction is as follows: Suitably attached to the motor housing, 6, is an open casing, 7, provided about midway of its length with a sealing-head, 8, in which is mounted an outer bearing for said shaft, which shaft also extends through said head. This sealing-head also constitutes the head of the valve, 60, later herein described.

The casing, 7, serves in part as a grinding chamber, encircling the grinding elements hereinafter described. Suitably mounted on said casing is a head, 9, provided with an opening, 10, connecting a hopper, 11, adapted to receive the coffee berries to be ground, with the grinding chamber.

The grinding mechanism is comprised of two members, a male member or burr, 12, rotatable with said shaft, 5, and a stationary female burr, 13, fixedly mounted on a stub-shaft, 14, which is provided with a head, 15, adapted to engage the inner recessed portion, 16, of said female burr.

Said male burr is of two parts, consisting of a bed plate, 17, fixedly mounted on said shaft, 5, and a semi-tapered portion, 18, loosely mounted on said shaft and held thereon by means of a screw, 19, threaded into the end of said shaft. Interposed between said tapered portion, 18, and a reduced portion, 20, of said shaft is a sleeve, 21, provided with a shoulder, 22, adapted to receive the screw, 19. In suitable cavities, 23, provided in said bed-plate, 17, are plungers, 24, which are seated on helicon springs, 25, received in said cavities. The round heads, 26, of said plungers when normally pressed outward by the action of said springs, engage slight depressions, 27, in the back of said portion, 18. When the two parts of said male burr are mounted on said shaft, and the proper adjustment is made, the heads of said plungers will engage the depressions,—the male burr will then rotate when said shaft, 5, rotates.

The said stub-shaft, 14, is placed endwise to said shaft, 5, and extends outward through the outer end of said casing, 7. Secured to said stub-shaft is a sleeve, 28, whose outer surface is threaded to receive an adjusting nut, 29, provided with a knurled knob, 30, outside of said casing, 7. Between the inner end of the said sleeve, 28, and the end wall of the female burr is a bed-plate, 31, formed to provide a seat for said female burr, and provided, also, with an annular longitudinal flange, 32. Interposed between said female burr and said bed-plate, 31, is a packing, 33, of any suitable material. Said bed-plate, stub-shaft, packing and female burr are fixedly secured together by means of the threaded sleeve, 28, which engages the threaded portion of said stub-shaft. Mounted in said casing, 7, between said annular longitudinal flange, 32, of the bed-plate is a guide sleeve, 34, provided on its inner end with an inwardly projecting annular flange, 35, and on its outer end with an upwardly projecting annular flange, 36. Said guide sleeve is secured to said casing, 7, by means of screws, 37. Received by threads suitably provided in a recessed portion, 38, of said sleeve is a threaded flat ring washer, 39, which encircles the reduced portion, 40, of said nut, 29, and which contacts with the shoulder, 41, thereon. Suitably mounted on said nut is a dial, 42. As the flange, 35, and the threaded washer, 39, prevent longitudinal displacement of the nut, 29, when the same is turned, by manipulation of said nut the female burr may be advanced towards or withdrawn from the male burr,—thereby regulating the fineness of the grind.

The tapered portion, 18, of said male burr is externally fluted (not shown) and co-operates with the internally fluted portion (also not shown) of the female burr to crack the coffee berries when first fed into the mill; the cracked berries are then further ground between the toothed portions, 43 and 44, respectively, of the male burr and the female burr. Wipers, 45, with which the bed-plate, 17, is provided, radially project over the said toothed portion, 43, of said male burr; these wipers tend to keep the ground materials in motion and prevent clogging in the grinding chamber.

Rigidly affixed to said shaft, 5, is a fan, 46, within a fan-chamber, 47, formed by the aforesaid sealing-head, 8, and the lower ends, 48, of a conduit, 49, which extends to said grinding-head, 9. Below said fan-chamber is a second conduit, 50, through which the chaff, dust, and other impurities sucked from the cracked or ground coffee berries is discharged into a cyclone collector, 51, located below said base.

That portion of the conduit, 49, nearest the grinders is divided into two channels, 52 and 53, respectively, which encircle that portion of the casing, 7, which constitutes the grinding chamber. The said channels are again joined after passing said casing, 7, and open into a spout, 54, common to each. Each conduit, 49, it should be noted, turns to the right as it leaves its respective fan, continues on parallel lines with the other, and then dips downward encircling the grinding elements.

Said spout, 54, is comprised of two channels, 55 and 56, respectively, separated from each other by a partition, 57. Below the lower end of said partition these channels open into the mouth, 58, of said spout, 54. The ground material, as it comes from the grinders, flows, by gravity, through the first mentioned channel, 55, to the mouth of said spout, or through a supplementary channel, 59, according to the position of the cup-shaped valve, 60, next herein described.

Said valve forms the inner head of the grinding chamber, lying within the inner end of said casing, 7. It is provided with a handle, 61, extending through openings formed in the said casing, 7, and the head, 9. Its position may be changed from time to time, for purposes hereafter explained, being guided in its movement by means of an annular flange, 62, received in an annular groove provided in the ring, 63, suitably attached to said casing, 7. The valve is provided with an opening, 64, which registers with the opening, 65, of the channel, 55, when the valve is in one position, and which registers with the opening, 66, of the supplementary channel, 59, when the valve is in another position. By manipulation of the valve the course of the ground coffee is thus controlled. The valve is further provided with a long opening, 67, which registers with the opening, 10, whenever the opening 64, is functioning. The supply of berries to the grinding chamber may, if desired, be entirely stopped by covering the said opening, 10, with the solid back portion, 68, of said valve.

When the valve is turned so that its interior is in communication with the registering opening, 65, the ground coffee will pass through the channel, 55, and be subjected to the air current induced by the operation of the fan 46, in the mouth of the spout, 54. But when the valve is turned to close the opening, 65, and to open the opening, 66, the ground coffee will pass into the supplementary channel, 59, and thereafter be discharged undisturbed by any air current. The current of air induced by the fan, in passing through the body of falling ground coffee as it is delivered from the spout, 54, raises the lighter particles,—such as dirt, dust and chaff—and conveys them to the cyclone, 51, heretofore mentioned. The cleaned coffee continues falling and is caught in any suitable container (not shown) placed below said spout. The relative courses of the air and ground material are indicated by arrows and dots, respectively.

Having thus described my invention, what I desire to secure and to claim by Letters Patent, is:

1. In a coffee-mill, the combination of a base, a motor, a rotatable main shaft extending through the motor heads, a fan chamber on each side of said motor, sealing-heads for said fan chambers, a fan tight on said main shaft within the fan chambers, a grinding chamber outside of each fan chamber, grinding mechanisms within said grinding chambers, the same consisting of a male burr mounted on said shaft and rotatable therewith, and a female burr adjustable towards and away from said male burr, and parallel conduits above said motor connecting opposite fans and grinding chambers.

2. In a coffee-mill, the combination of a base; a motor; a housing for said motor; a rotatable main shaft extending through the motor heads; a fan chamber on each side of said motor; sealing heads for said fan chambers; a fan tight on said main shaft within each said fan chamber; an open casing attached to the motor housing on each side thereof; a grinding chamber within each of said casings; grinding mechanisms within said grinding chambers, the same consisting of a male burr mounted on said shaft and rotatable therewith and a female burr adjustable towards and away from said male burr; parallel conduits above said motor housing connecting opposite fans and grinding chambers; and conduits for discharging the chaff removed from the coffee berries during the cracking operation.

3. In a coffee-mill, the combination of a base; a motor; a housing for said motor; a rotatable main shaft extending through the motor heads; a fan chamber on each side of said motor; sealing heads for said fan chambers; a fan tight on said main shaft within each of said fan chambers; an open casing attached to the motor housing on each side thereof; a grinding chamber within each of said casings; grinding mechanisms within said grinding chambers, the same consisting of a male burr mounted on said shaft and rotatable therewith and a female burr adjustable towards and away from said male burr; parallel conduits above said motor housing connecting opposite fans and grinding chambers; conduits for discharging the chaff removed from the coffee berries during the cracking operation; and means for selectively controlling the course of the ground materials as they come from the grinding mechanisms.

4. In a coffee-mill of the character described, a base; a motor mounted thereon; a housing for said motor; duplicate chaff-separating and granulating mechanisms within a casing attached to and projecting outwardly from the motor housing; said granulating mechanisms consisting of a rotatable male burr and a stationary female burr adjustable towards and away from said male burr, both burrs being positioned in alignment with each other; a fan chamber located between said grinding elements and said motor housing; a sealing head for said fan chamber; a fan within said fan chamber; conduits connecting opposite fans and grinding chambers; and means for selectively controlling the course of the ground materials as they come from the grinding mechanisms.

5. In a coffee-mill of the character described, a base; a motor mounted thereon; a housing for said motor; duplicate chaff-separating and granulating mechanisms within a casing attached to and projecting outwardly from the motor housing; said granulating mechanisms consisting of a rotatable male burr, and a stationary female burr adjustable towards and away from said male burr, both burrs being positioned in alignment with each other; a fan chamber located between said grinding elements and said motor housing; a sealing head for said fan chamber; a fan within said fan chamber; conduits connecting opposite fans and grinding chambers; means for selectively controlling the course of the ground materials as they come from the grinding mechanisms; and conduits for discharging the impurities removed from the coffee berries during the grinding process.

In testimony whereof I have hereunto affixed my signature.

FRANK F. WEAR.